June 25, 1968   F. MICHIELSEN   3,389,650
PACKING-FILTERS AND DEVICE FOR USING SUCH PACKING-FILTERS
Filed April 14, 1965   2 Sheets-Sheet 1
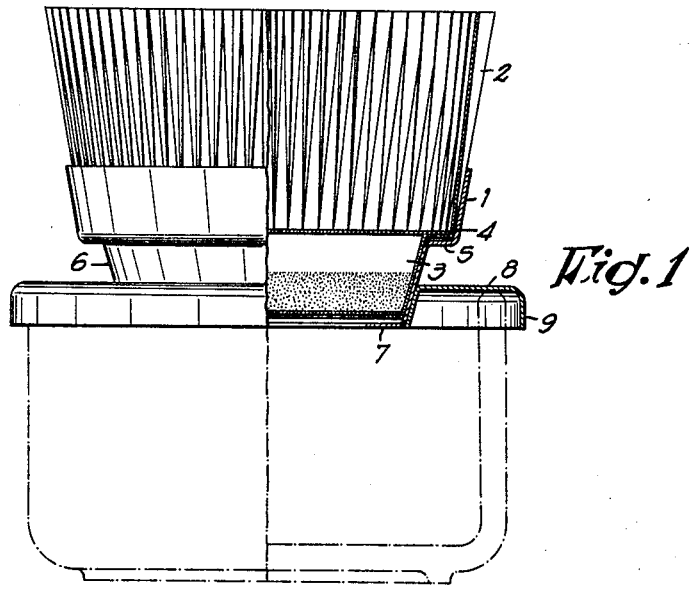
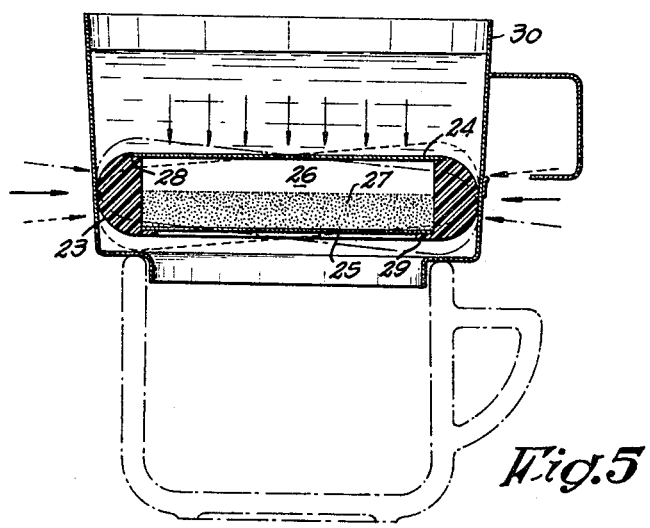
INVENTOR.
F. M. Michielsen
BY
Richards & Geier
ATTORNEYS

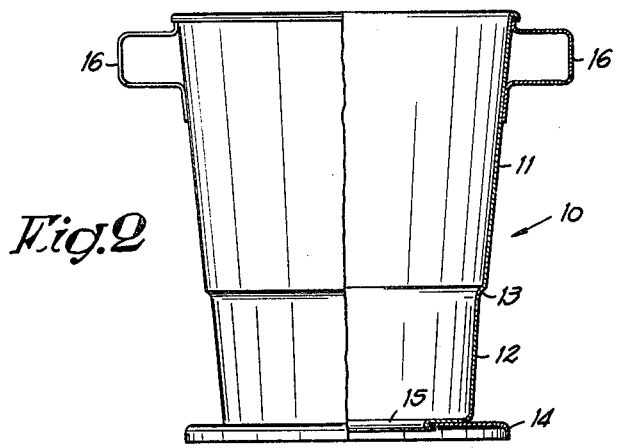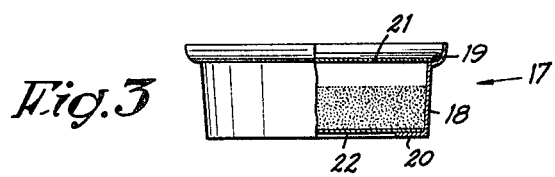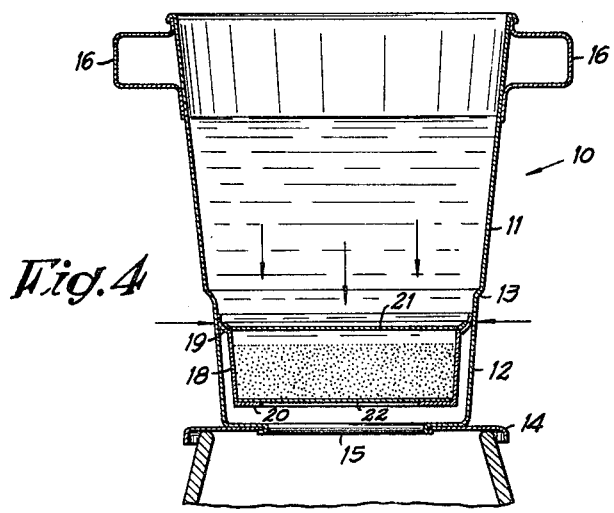

United States Patent Office 3,389,650
Patented June 25, 1968

3,389,650
PACKING-FILTERS AND DEVICE FOR USING
SUCH PACKING-FILTERS
Franciscus Michielsen, Turnhout, Belgium, assignor to
Miko P.V.B.A., Turnhout, Belgium, a company of
Belgium
Filed Apr. 14, 1965, Ser. No. 448,184
Claims priority, application Belgium, Apr. 21, 1964,
646,823, 646,824; Mar. 24, 1965, 661,534
5 Claims. (Cl. 99—295)

ABSTRACT OF THE DISCLOSURE

Ground coffee is located in an envelope having two sides or discs which may serve as filters and which are pervious to water. The envelope is preferably combined with a vessel for water which may have pleated walls providing a firm connection with the envelope.

The present invention concerns packing-filters mainly consisting of the combination of an envelope containing a given amount of ground coffee, whereby the envelope in question has two bases which are pervious to water and whereby aforesaid envelope forms the bottom of a vessel, made of an exceptionally thin, highly deformable wall.

In the practical use of such packing-filters, which are particularly light and economical, the problem of supporting them adequately whilst being used, is of the utmost importance. One of the characteristic features of this type of packing-filters is to be found in the fact that use can be made of supports which, at the same time, are efficient and acceptable for the economic run of the business. It is also possible to use indifferently either stiff reusable supports for a single dose or for multiple doses, namely for home use, whereas another possibility is the use of very cheap supports which can simply be discarded or destroyed after having been used only once, such as the packing filter mentioned above.

The first characteristic feature conforming to the present invention is that the envelope is so to say connected with the support by the hydrostatic pressure of the liquid medium which is placed on top. The vessel containing aforesaid liquid medium may or may not be an integral part of aforesaid packing-filter.

In this way it will be possible, according to the present invention, when the envelope containing the dose of ground coffee is provided with a pleated wall placed above, to support the base of the latter by an outer stiff ring which is connected either with aforesaid pleated wall, or with the support.

Another characteristic feature conforming to the present invention finally consists in the fact that the envelope is formed by an annular element which is completed by two discs of filter paper between which the dose of ground coffee is contained, whereby the annular element is made of a comparatively elastic or plastic material and of which the dimensions and the shape are such that it can be held by an elastic pressure against the wall of the vessel into which the boiling water will be poured.

In order to provide a clearer explanation of the characteristic features of the invention, a few preferred forms of embodiment are described below, without employing any limitation, as illustrated by the appending figures of which:

FIGURE 1 illustrates partly as a side view and partly as a cross-section, the application of a nonreusable device according to the present invention;

FIGURE 2 illustrates partly a lateral view and partly a radial cross-section of a bottomless vessel according to the present invention;

FIGURE 3 illustrates partly a lateral view and partly a radial cross-section of an envelope conforming to the present invention;

FIGURE 4 is a radial cross-section of a filter according to the present invention;

FIGURE 5 is a diametral cross-section of a simplified form of embodiment.

As is diagrammatically illustrated in FIGURE 1, a device according to the present invention consists of any supporting or holding element which is formed in such way that it surrounds and supports to a certain height the deformable wall of the upper vessel of the packing-filter.

In this case, the device is diagrammatically represented by a ring 1 of which the inner diameter is practically the same as the outer diameter of the corresponding part of vessel 2 which is placed over the filtering envelope 3 containing the dose of ground coffee.

This ring 1 is made in such way that it surrounds the lower part of aforesaid deformable wall of vessel 2. By means of this extremely simple device, the result is obtained that aforesaid vessel 2 offers a considerably increased radial resistance.

This unexpected effect resulting from the application of such simple means can be explained in the following way:

The wall of vessel 2 which is preferably pleated, is connected through a nonpleated part 4 with the lower envelope 3. It follows therefrom that part 4 offers a resistance to deformation which is considerably smaller than that of the pleated part which, on account of the fact that it hardly has any support sags around aforesaid zone 4. The device 1 which acts as support for the lower part of the wall of aforesaid vessel 2 and which comes to lay between the upper and the lower part of the latter, practically prevents the deformation of aforesaid dangerous zone 4, which has for result that the pleats, by increasing the moment of inertia of the corresponding wall, have the possibility to act as reinforcing means.

Aforesaid ring 1 may of course be part of devices or of all kinds of supports which, according to the intended applications, have their own appropriate shapes and dimensions.

Aforesaid ring 1 may for instance be part of a shaped wall of which the diameter is for instance equal or approximately equal to that of the lower part of the packing-filter with which this device must be used.

With this purpose in view, aforesaid ring 1 is extended downward by an internal support 5, a wall 6 shaped as a truncated cone and an internal annular border 7. Aforesaid wall shaped as a truncated cone is mounted in an annular base 8 of which the outer edge 9 is bent downward.

This complete arrangement can fulfill several functions, viz.: form the annular support described above; make possible the manipulation of the packing-filter, either before, during or after use, without any difficulties or drawbacks, notwithstanding the extreme deformability of its vessel 2 and the hydrostatic load acting thereon; and finally as advertising support for the very visible surface of the annular base 8.

The present invention concerns any device, respectively any hold or support for such packing-filter comprising an upper deformable vessel, in so far as it contains at least a suspension for the lower part of aforesaid vessel with the purpose of increasing the resistance to radial deformations.

In the nonlimitative example of FIGURE 2, the vessel 10 consists of a body comprising two truncated cones 11–12 connected by a curved part 13 which forms a guiding and centering ridge. This body 10 carries at the bottom a base 14 by means of which it can rest in a very stable way on a vessel placed thereunder and which can have any suitable shape and capacity. In this example, vessel 10 and base 14 are shown as having a central opening, or in other words, the vessel 10 is made without a bottom. It would of course be possible to provide this vessel with a perforated bottom. The body is provided with handles 16 or any other accessories which might be considered of use.

In this case, the envelope 17 consists of a sidewall 18 shaped as a truncated cone of which the upper edge is bent outward and upward in order to form a little collar of which the cross-section is nearly-L-shaped with a rounded top. The lower edge 20 is bent in such way so as to form an annular edge bent inward. The thickness and the kind of material used for manufacturing this wall 18-19-20 have been chosen in such way that the little collar 18 and the edge 20 have a certain rigidity.

Onto the inner part of aforesaid little collar 19 and of aforesaid edge 20, are fastened, merely by sticking, the bottoms 21-22 respectively, whereby these bottoms are made of some material pervious to water, such as filter paper for instance, it being well understood that the required amount of ground coffee is enclosed in the space which has thus been formed.

The main characteristic feature, apart from the morphological arrangement which has been described, consists according to the present invention, in the fact that the dimension and the shape of the little collar 19 of the envelope 17 are definitely determined in accordance with the dimensions and the conicity of the part 12 of vessel 10 in such way that, under the pressure exerted by the hydrostatic column, a vertical pressure tends to force the envelope 17 to sag into aforesaid part 12, whilst by reaction, a radial pressure coming to bear between the little collar 19 and the corresponding part of the inner wall of aforesaid part 12 ensures a systematic sealing on account of which all the boiling water is necessarily expelled and forced to pass through aforesaid envelope 17.

Due to the presence of the rounded inner edge 13, the envelope which is freely being dropped into the vessel 10, comes systematically into its place, which would be very difficult to achieve with a simple truncated conical vessel of which the inner wall extends in an uninterrupted way over the whole height.

The vessels 10 and the envelopes 17 will naturally be manufactured according to the amount of coffeee to be prepared, whereby the amount must obviously be determined beforehand. In the form of embodiment according to FIGURE 5, the packing-filter consists of a simple annular element 23 made of a natural or artificial material which must however have a certain elasticity or plasticity and must also be absolutely neutral and able to withstand the effect of boiling water and the constituents of the coffee. By way of example, it would be possible to use certain kinds of latex devoid of smell, or plastics of the kind which are generally accepted as packing material for foodstuffs.

It might further be possible to use other elastic or plastic substances, provided that aforesaid annular elements are enveloped or embedded in such way that at least their outer surface is protected by a neutral and resistant layer.

The cross-section of this annular element may have any appropriate shape which may either be geometrical or not, whereby this shape will generally be determined by the characteristics of the vessels with which these elements are to be used.

The simplified packing-filter illustrated in FIGURE 5 is completed by two discs 24-25, made of filterpaper for instance, which thus constitute the walls of a chamber 26 in which the required dose of ground coffee 27 is poured to a height which is considerably less than the thickness of aforesaid annular element 23.

Preferably, the annular element 23, such as illustrated in FIGURE 5, will be shaped in such way that it presents an annular bearing surface 28 and an annular inner collar 29 which facilitates the assembly and the filling of the packing-filter on account of the fact that all handling can be performed from the outside and from the same direction.

As shown in the conventional manner in this FIGURE 5, such packing-filter can readily be fastened in any appropriate vessel 30, and this even at a slight angle, which is being shown diagrammatically by the broken lines, this happening without interfering in any way with the perfect tightness of the connection between aforesaid packing-filter and aforesaid vessel 30.

Preferably, the height of the layer of coffee will be equal or approximately equal to half the thickness of aforesaid envelope.

The present invention concerns, individually, aforesaid vessels and aforesaid envelopes in so far as they have expressly been made for the purpose of applying the improvements introduced by the invention, as well as the application of such envelopes in such vessels, in itself.

What I claim is:

1. A filter device comprising, in combination, a vessel adapted to contain a quantity of water and having an outer wall consisting of a deformable material, an envelope adapted to contain a dose of coffee and having an outer wall having a portion constituting a part of the outer wall of said envelope, a lower annular inner edge limiting the lower border of the outer wall of said envelope, a disc of filtering material fixed upon said lower edge and another disc of filtering material fixed upon said upper edge and constituting a flat ring-shaped element, and a separate ring-shaped support carrying said envelope, said envelope being pressed against said support by the weight of water poured into said vessel.

2. A filter device in accordance with claim 1, wherein the diameter of said ring-shaped element is larger than the diameter of said ring-shaped support.

3. A filter device in accordance with claim 1, wherein the outer wall of said vessel and the outer wall of said envelope have the shape of truncated cones.

4. A filter device in accordance with claim 1, wherein said ring-shaped support has an inner conical surface engaging said envelope and an outer cylindrical surface.

5. A filter device in accordance with claim 4, wherein the outer cylindrical surface of said ring-shaped support consists of a downwardly turned peripheral edge.

References Cited

UNITED STATES PATENTS

| | | | |
|---|---|---|---|
| 1,876,474 | 9/1932 | Starkey | 99—304 |
| 1,953,291 | 4/1934 | DeVry | 99—306 |
| 2,234,397 | 3/1941 | Bentz | 99—306 |
| 2,358,556 | 9/1944 | Block | 99—306 |
| 2,630,227 | 3/1953 | Rodwell | 210—282 X |
| 2,743,664 | 5/1956 | Dale | 99—306 X |
| 2,859,878 | 11/1958 | Spiselman | 99—304 |
| 2,936,695 | 6/1960 | Donot | 99—304 X |
| 3,030,874 | 4/1962 | Fiori | 99—295 X |
| 3,083,101 | 3/1963 | Noury | 99—295 X |

ROBERT W. JENKINS, *Primary Examiner.*